United States Patent [19]

Ueki

[11] Patent Number: 5,159,246
[45] Date of Patent: Oct. 27, 1992

[54] DETECTION OF RELATIVE POSITION BETWEEN MAGNETIC POLE AND DRIVE COIL IN BRUSHLESS DC MOTOR

[75] Inventor: Yasuhiro Ueki, Sagamihara, Japan

[73] Assignee: Victor Company Of Japan, Ltd., Yokohama, Japan

[21] Appl. No.: 745,762

[22] Filed: Aug. 16, 1991

[30] Foreign Application Priority Data

Aug. 18, 1990 [JP] Japan .................. 2-217782

[51] Int. Cl.⁵ .................................. H02K 29/00
[52] U.S. Cl. ........................... 318/254; 318/138; 318/439
[58] Field of Search ............... 318/138, 254, 439

[56] References Cited

U.S. PATENT DOCUMENTS

| | | | |
|---|---|---|---|
| 4,262,236 | 4/1981 | Gelenius et al. | 318/138 |
| 4,262,237 | 4/1981 | Gelenius | 318/254 |
| 4,641,066 | 2/1987 | Nagata et al. | 318/254 |
| 4,694,210 | 9/1987 | Elliott et al. | 310/68 R |
| 4,712,050 | 12/1987 | Nagasawa et al. | 318/254 |
| 4,743,815 | 5/1988 | Gee et al. | 318/254 |
| 4,760,316 | 7/1988 | Hedlund | 318/254 |
| 4,814,677 | 3/1989 | Plunkett | 318/254 |
| 4,876,491 | 10/1989 | Squires et al. | 318/138 |
| 4,900,993 | 2/1990 | Yasohara et al. | 318/254 |
| 4,912,378 | 3/1990 | Vukosavic | 318/254 |
| 4,928,043 | 5/1990 | Plunkett | 318/254 |
| 4,970,445 | 11/1990 | Kimura et al. | 318/254 |
| 5,015,927 | 5/1991 | Reichard | 318/254 X |
| 5,023,527 | 6/1991 | Erdman et al. | 318/254 |
| 5,028,852 | 7/1991 | Dunfield | 318/254 |
| 5,036,264 | 7/1991 | Ueki | 318/254 |
| 5,043,643 | 8/1991 | Hedlund et al. | 318/254 |
| 5,057,753 | 10/1991 | Leuthold et al. | 318/254 |
| 5,068,582 | 11/1991 | Scott | 318/254 |
| 5,075,608 | 12/1991 | Erdman et al. | 318/599 |

Primary Examiner—Bentsu Ro
Attorney, Agent, or Firm—Pollock, VandeSande & Priddy

[57] ABSTRACT

A sensorless type, brushless direct-current motor which is equipped with a rotor having a plurality of magnetic poles and multi-phase coils which are wound around a magnetic core to form magnetic paths and whose first terminals are connected in common to each other, the rotor being rotationally driven by selectively supplying bidirectional currents to the other terminals of said multi-phase coils. The motor is provided with an energization circuit which successively performs energizations of the multi-phase coils with predetermined patterns for all combinations of two of the multi-phase coils when the rotor is in a stopping state. A voltage-measuring circuit measures a voltage developed at the commonly connected first terminals of the multi-phase coils at every energization pattern in correspondence with a variation of an inductance generated in the coils due to the magnetic flux passing through the magnetic core. A position detecting unit detects a relative position of the rotor with respect to the multi-phase coils on the basis of the voltage measured by the voltage-measuring circuit so that the rotation of the motor is started on the basis of the detected relative position.

3 Claims, 6 Drawing Sheets

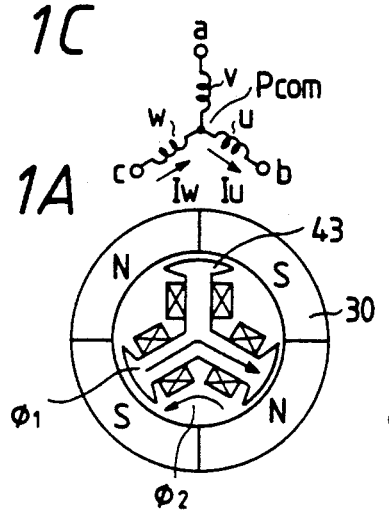
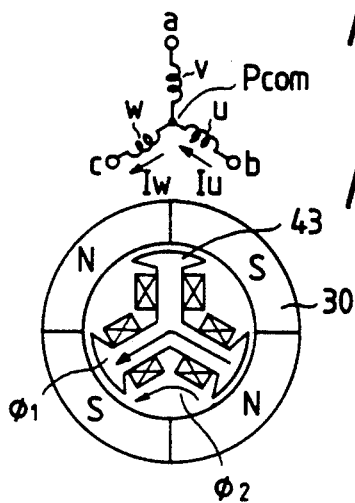
FIG. 1C   FIG. 1D
FIG. 1A   FIG. 1B
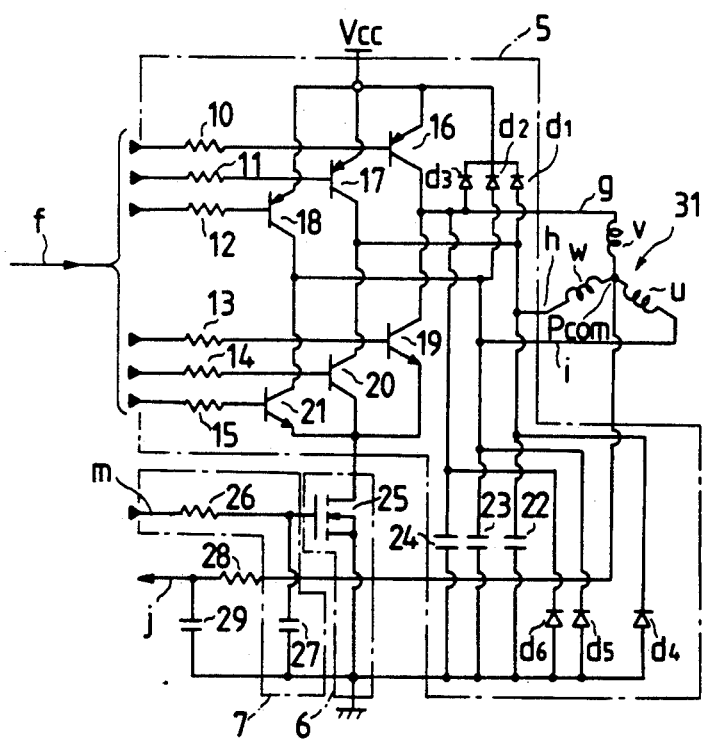
FIG. 5

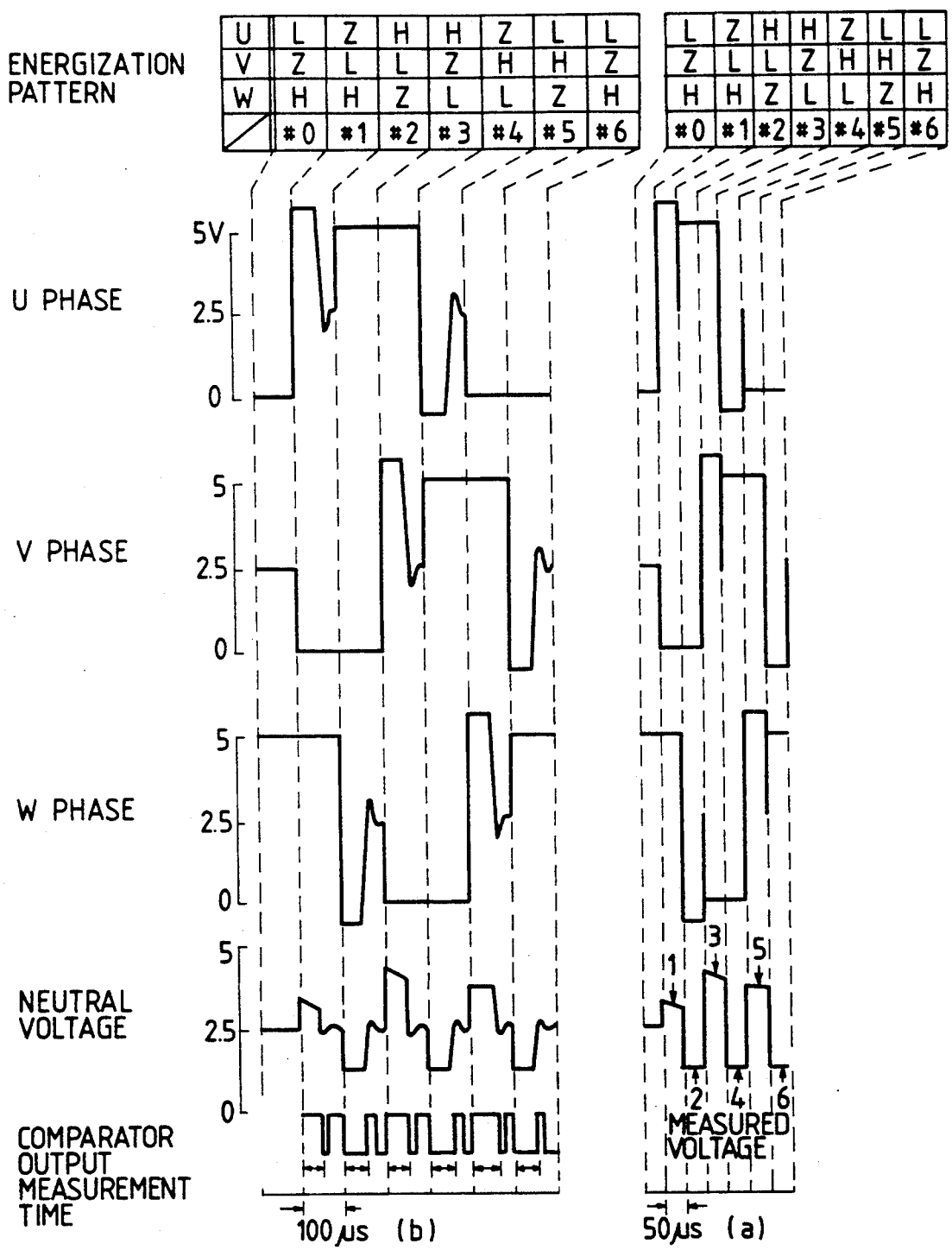

DETECTION OF RELATIVE POSITION BETWEEN MAGNETIC POLE AND DRIVE COIL IN BRUSHLESS DC MOTOR

BACKGROUND OF THE INVENTION

The present invention relates generally to brushless direct-current motors not having a sensor to detect the position information of the rotor, and more particularly to such a brushless motor equipped with a system to adequately and effectively perform the drive current phase control from the start timing.

Generally, in brushless direct-current (DC) motors to be used in hard disk drives (HDD), video tape recorders (VTR) and the like, the relative position between the magnetic pole and the drive coil is arranged to be detected by means of a position sensor such as a Hall device so as to control the phase of the current to be supplied to the drive coil to obtain a desirable rotation of the motor. On the other hand, brushless DC motors which are arranged to perform the drive current phase control without using such a position sensor (which will be referred hereinafter to as sensorless type brushless DC motors) have recently been developed for the apparatus size reduction and cost reduction purposes. An important problem arising with such sensorless, brushless DC motors relates to the fact that the relative position relation between the magnetic pole and the drive coil is not constant at the time of the start of rotation of the brushless motor, whereby difficulty is encountered to adequately and effectively perform the drive current phase control from the time of the rotation start. One known technique to eliminate this problem is disclosed in the U.S. Pat. No. 4,876,491. This technique involves performing the comparison between the currents to the multi-phase coils to detect the position of the rotor on the basis of the comparison results obtained from a train of current pulses. However, because of the relative position detection being based on the current detection, this technique requires series resistors in the drive circuit whereby there is the possibility that the electric power loss occurs on the normal rotation.

SUMMARY OF THE INVENTION

It is therefore an object of the present invention to provide a sensorless type brushless DC motor having a system for adequately detecting a relative position between the coils and the magnetic poles of the rotor for starting the motor correctly.

According to the present invention, a sensorless, brushless direct-current motor is equipped with multi-phase coils which are wound around a magnetic core to form magnetic paths and whose first terminals are connected in common to each other. Further, the coils are equipped with a rotor having a plurality of magnetic poles so that the rotor is rotationally driven by selectively supplying bidirectional currents to the other terminals of the multi-phase coils. There are provided energization means for successively performing energizations of the multi-phase coils with energization patterns respectively predetermined for all combinations of two of the multi-phase coils when the rotor is in a stopping state. A comparison is made of a reference voltage with a voltage developed at the other terminal of the coil. This is in a non-energized state in correspondence with a variation of an inductance generated in the coils due to a vector sum of a magnetic flux passing through the magnetic paths in response to the energization to the coils and a magnetic flux passing through the magnetic paths by the magnetic poles of the rotor. On the basis of time taken until the output value of the comparison means varies after the energization with one of the energization patterns is performed with respect to the coil whose voltage is compared therewith by comparison means, position detecting means detects a relative position of the rotor with respect to the multi-phase coils.

Further, in a sensorless, brushless direct-current motor according to the present invention, there are provided energization means for successively performing energizations of the multi-phase coils with energization patterns respectively predetermined for all combinations of two of the multi-phase coils. When the rotor is in a stopping state a comparison is made between a reference voltage and a voltage developed at the commonly connected first terminals of the multi-phase coils. The developed voltage is in correspondence with a variation of an inductance generated in the coils due to a vector sum of a magnetic flux passing through the magnetic paths in response to the energization to the coils and a magnetic flux passing through the magnetic paths by the magnetic poles of the rotor. On the basis of time taken until the output value of the comparison means varies after the energization, position detecting means detects a relative position of the rotor with respect to the multi-phase coils.

Still further, in a sensorless type, brushless direct-current motor there is provided energization means which successively performs energizations of the multi-phase coils with predetermined patterns for all combinations of two of the multi-phase coils. When the rotor is in a stopping state, voltage-measuring means measures a voltage developed at the commonly connected first terminals of the multi-phase coils at every energization pattern in correspondence with a variation of an inductance generated in the coils due to the magnetic flux passing through the magnetic core. A position detecting unit detects a relative position of the rotor with respect to the multi-phase coils on the basis of the voltage measured by the voltage-measuring circuit so that the rotation of the motor is started on the basis of the detected relative position.

The inductance of the coil wound around the magnetic core varies in accordance with the relative position between the rotor and the magnetic poles and the current flowing through the coil because the permeability of the core varies in accordance with the magnetic flux passing therethrough. Thus, if detecting the variation of the inductance, it is possible to detect the relative position between the rotor and coil as to specify the current direction and the phase for starting the motor in the normal direction. Features of the present invention are that current pulses are given for all combinations of two phases of the star-connected multi-phase coils when the rotor is in the stopping state so that the voltage developed at the neutral point is measured at every energization pattern and compared with the steady-state voltage (½ of the voltage to be applied to the series-connected two phases coils). This detects the relative position between the rotor and the magnetic poles on the basis of the comparison results, or so that the width of the voltage pulse developed at the neutral point or the other terminal of the coil is measured so as to detect the relative position therebetween on the basis of the pulse width measurement results.

BRIEF DESCRIPTION OF THE DRAWINGS

The object and features of the present invention will become more readily apparent from the following detailed description of the preferred embodiments taken in conjunction with the accompanying drawings in which:

FIGS. 1A to 1D are illustrations for describing the principle of the position detection of a rotor of a sensorless type, brushless DC motor which is the base of this invention;

FIG. 5 is an illustration of a circuit arrangement to be used in the FIGS. 2 to 4 systems;

FIG. 6 is a graphic illustration for describing the rotor position detection according to this invention;

DETAILED DESCRIPTION OF THE INVENTION

Figure 2:
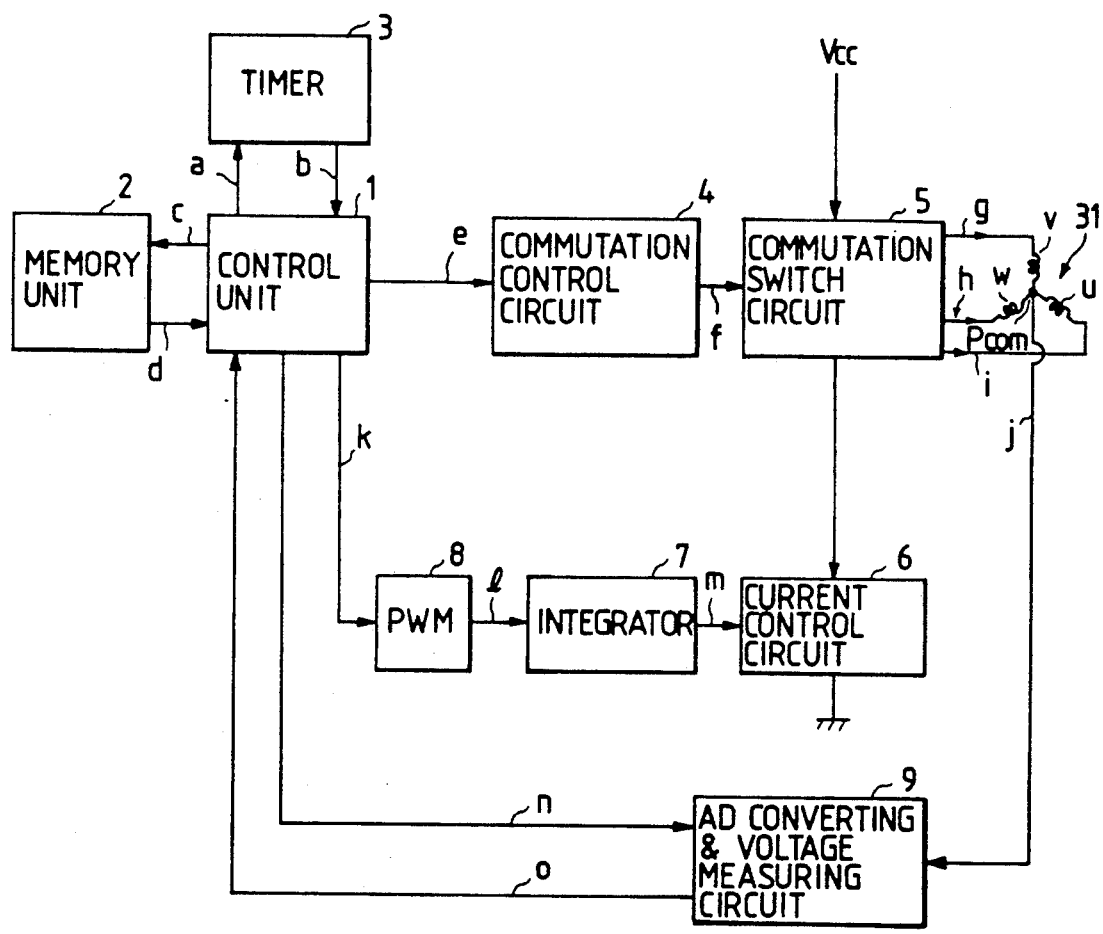
FIGS. 2 to 4 are block diagrams showing arrangements of rotor position detecting systems according to embodiments of this invention.

Prior to describing an arrangement of an embodiment of the present invention, a description will be made with reference to FIGS. 1A to 1D in terms of a principle of the position detection of a rotor in a brushless DC motor which is the base of the present invention.

In sensorless type, brushless DC motors equipped with a rotatable rotor having a plurality of magnetic poles and three-phase coils, one end portions (which will be referred hereinafter to as first terminals, and the other end portions will be referred hereinafter to as the other terminals) are coupled in common to each other (star-connection). This way, the rotor is rotationally driven in response to selective supplies of bidirectional currents to the other terminals of the three-phase coils, in cases where a 120 degree energization (supplies current to all combinations of two coils selected from the three-phase coils) is performed by means of a power source having a voltage value of Vcc when the rotor is in the stopping state. In principle, the voltage (neutral point voltage) Vcom to be developed at the steady state at the connection point Pcom of the star-connected three-phase coils becomes Vcc/2 because the first coil of the start-connected three-phase coils is at its other terminal coupled to the plus terminal of the power source. The second coil thereof is at its other end coupled to the minus terminal of the power source and the third coil thereof is at its other terminal opened. In the case of being in the steady state when the rotor is in the stopping state, not only the affection of the inductance L each of the start-connected three-phase coils can be disregarded but also the energy accumulated in the coil having the opened terminal can be disregarded because the completion of discharging.

As illustrated in FIGS. 1A to 1D, in the sensorless type brushless DC motor, the three-phase coils U to W are respectively wound around magnetic core 43 so that the inductance value of each of the three-phase coils U to W varies with the magnetic permeability of a portion of the core 43, around which the coil is wound, varying in accordance with the amount of the magnetic flux passing through the coil-wound core 43 portion. In the case that as illustrated in FIGS. 1A and 1B the arrangement patterns of the magnetic poles N, S, N, S magnetized and formed in rotors 30 are the same and the relations between the magnetic poles N, S, N, S and the coil-wound core 43 are the same, FIGS. 1C and 1D show energization patterns respectively corresponding to the arrangements as illustrated in FIGS. 1A and 1B. In FIGS. 1A and 1B, arrow $\phi 1$ and $\phi 2$ represent the directions of the magnetic fluxes passing through the core 43. In the case of performing the energizations for all combinations of two coils of the three-phase coils U to W (120 degree energization) as illustrated in FIGS. 1C and 1D, the magnetic flux $\phi 1$ is the magnetic flux which generates due to the current flowing through the three-phase coils U to W to pass through the core 43, and the magnetic flux $\phi 2$ is the magnetic flux which flows out from the magnetic pole N of the rotor 30 to directs through the coil-wound core 43 to the magnetic pole S of the rotor 30. Here, in the FIGS. 1A and 1B the magnetic flux $\phi 2$ is shown at the outside of the core 43. This is for the illustration only.

As obvious from FIG. 1A, the directions of the magnetic fluxes $\phi 1$ and $\phi 2$ become opposite to each other when performing the energization with the pattern illustrated in FIG. 1C. This can prevent the magnetic saturation at the portions of the core 43 through which the magnetic flux $\phi 1$, due to the currents Iw and Iu flowing through the coils W and U and the magnetic flux $\phi 2$, due to the magnetic poles N and S pass in the opposite directions. On the other hand, in the case of performing the energization with the pattern illustrated in FIG. 1D, the directions of the magnetic fluxes $\phi 1$ and $\phi 2$ passing through the core 43 become the same as illustrated in FIG. 1B. In this case, the magnetic saturation substantially occurs because of the addition of the magnetic fluxes $\phi 1$ and $\phi 2$. Here, the values of the inductances L of the three-phase coils U to W vary in accordance with the positional relation between the magnetic poles and the three-phase coils U to W and the energization pattern to the three-phase coils U to W. Thus, if the energization pattern to the three-phase coils U to W and the variations of the inductances L in the three-phase coils U to W are respectively clear, the positional relation between the magnetic poles and the three-phase coils U to W can be known. In the state where as described above the energizations are affected with respect to all combinations of two coils of the three-phase coils U to W, the values of the inductances of the coils U and W become great in the case as illustrated in FIG. 1A and become small in the case as illustrated in FIG. 1B. Accordingly, in cases where the above-mentioned energization is made with respect to the three-phase coils U to W when the rotor 30 of the brushless DC motor is in the stopping state, the voltage (neutral point voltage) Vcom to be developed at the transition at the connection point Pcom of the start-connected coils U to W assumes a value corresponding to the ratio of the impedance of the respective coils U to W and the discharge current of the electromagnetic energy $LI^2/2$ accumulated in the non-energized coil of the coils U to W which is in the non-energized state.

As described above, since the neutral point voltage thus measured varies in correspondence with the inductance values of the three-phase coils U to W wound around the core 43 and the discharge current of the electromagnetic energy $LI^2/2$ accumulated in the non-energized coil of the coils U to W, if the energization pattern for the three-phase coils U to W is known, it is possible to detect the positional relation between the magnetic poles of the rotor 30 and the three-phase coils U to W by measuring the neutral point voltage Vcom. Further, using the fact that the discharge current of the electromagnetic energy $LI^2/2$ accumulated in the non-energized coil of the coils U to W varies in accordance with the variation of the inductance, the duration of the signal obtained by comparing the neutral point voltage Vcom developed at the transition at the connection point Pcom of the star-connected coils U to W is measured by an adequate timer means whereby it is possible to measure the position of the rotor without an analog-to-digital converter.

Figure 3:
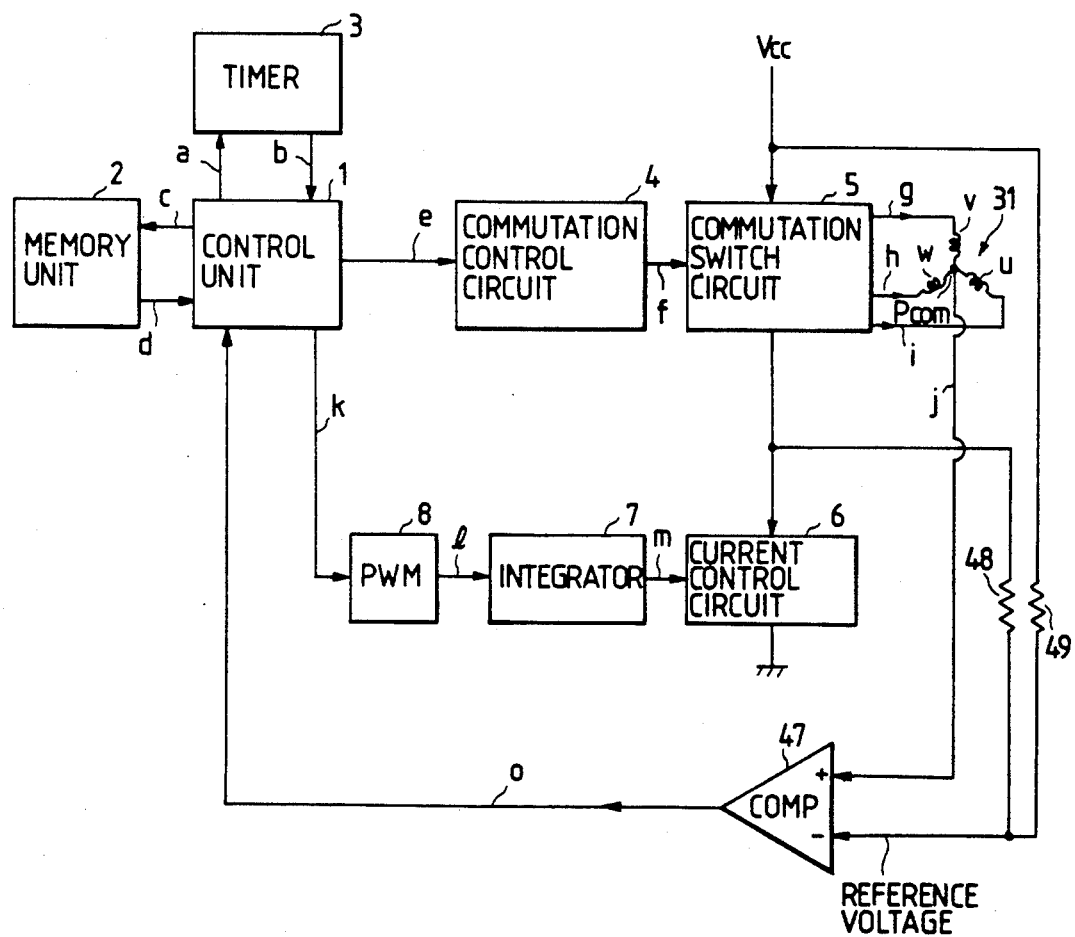
Figure 4:
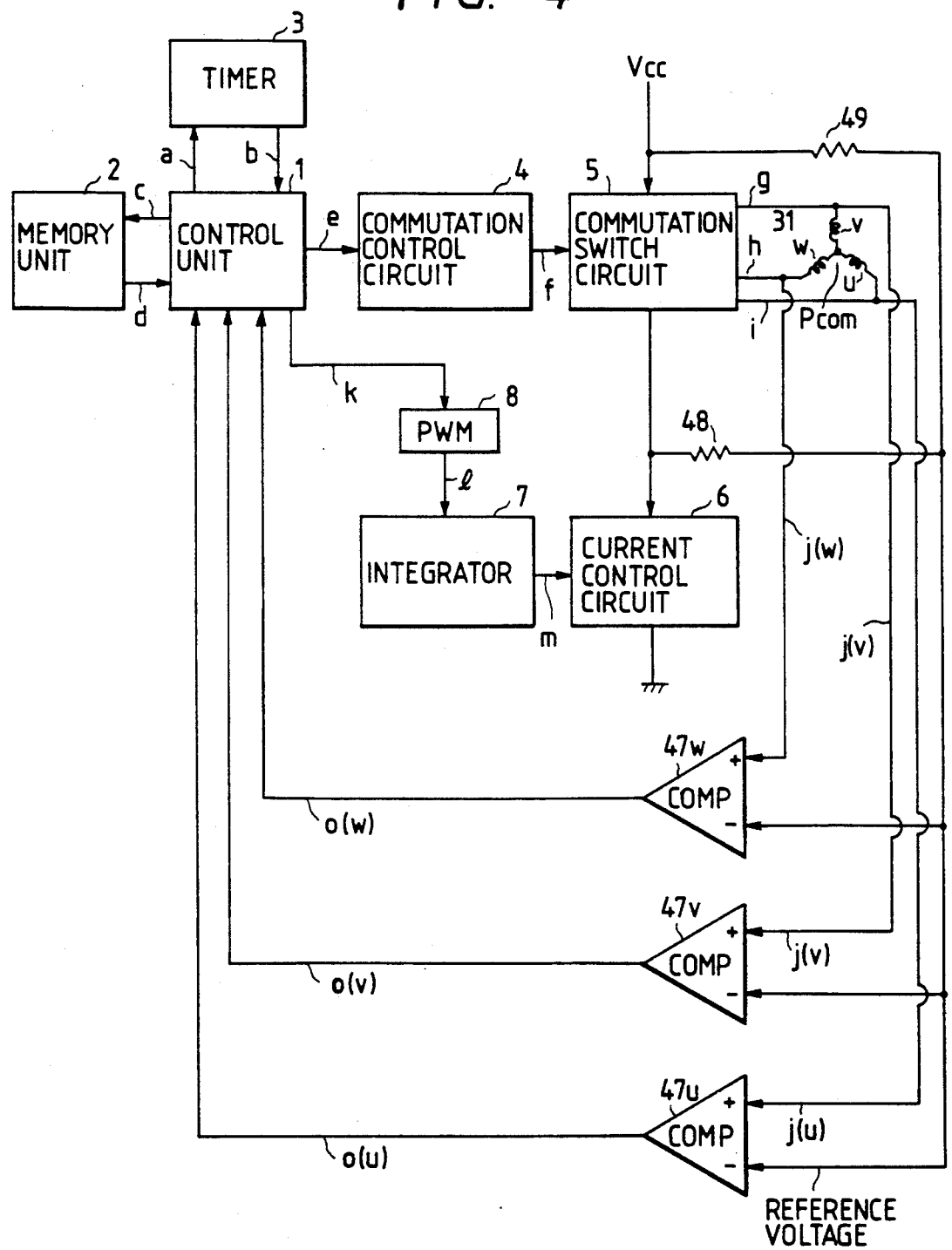

Referring now to FIGS. 2 to 4, there is illustrated a system for detecting the position of a brushless DC motor at the stopping time according to an embodiment of the present invention. In FIG. 2, illustrated at numeral 1 is a control unit which can be constructed by comprising a microprocessor unit such as µPD78312 manufactured by Nippon Electric Co., Ltd, M37700 series manufactured by Mitsubishi Electric Co., Ltd, and H8 series manufactured by Hitachi Seisakusho Co., Ltd. Also included in this system are a memory unit 2, a timer 3, a commutation control circuit 4, a commutation switch circuit 5, a current control circuit 6, an integrator 7, a pulse width modulation circuit (PWM), and an analog-to-digital (AD) converting and voltage-measuring circuit 9. Further, numeral 31 represents the three-phase coils U to W where Pcom depicts a connection point at which the three-phase coils U to W are coupled in common to each other. In FIG. 3, numeral 47 designates a voltage-measuring circuit, and in FIG. 4, 47u to 47w respectively represent voltage-measuring circuits. In addition, in FIGS. 3 and 4, 48 and 49 are resistors whose resistance values are equal to each other. Each of the two resistors 48 and 49 generates a reference voltage by dividing the power-supply voltage Vcc to the half, which is in turn applied to the voltage-measuring circuit 47 or the voltage-measuring circuits 47u to 47w. Here, the voltage Vcom to be developed at the connection point Pcom of the three-phase coils U to W may be stated as the neutral point voltage (or midpoint voltage) Vcom in this description.

The detailed arrangements of the commutation control circuit 5, current control circuit 6 and integrator 7 illustrated in FIGS. 2 to 4 are shown in FIG. 5. In FIG. 5, numerals 10 to 15, 26 and 28 respectively represent resistors, 16 to 21 transistors which act as commutation switches, 22 to 24, 27 and 29 are capacitors, and 25 denotes a field-effect transistor (FET). Further, d1 to d6 are protection voltage clamp diodes which are respectively coupled to the three-phase coils U to W. The voltage Vcom to be developed at the connection point Pcom of the three-phase coils U to W is coupled through a line i to the AD converting and voltage-measuring circuit 9 in FIG. 2, and coupled through a light j to the voltage-measuring circuit (comparator) 47 in FIG. 3. Further, in FIG. 4, the voltages to be developed at the other terminals of the three-phase coils U to W are respectively coupled through lines j(u), j(v) and j(w) to the voltage-measuring circuits (comparators) 47u to 47w.

Here, for rotating the rotor of the brushless motor, which is in the stopping state, in a predetermined rotational direction, drive currents have to be supplied to the three-phase coils U to W at predetermined commutation timings in accordance with the positional relation between the magnetic poles (magnetized and formed in the rotor) and the coils U to W. For starting the sensorless type brushless DC motor in predetermined direction, it is necessary that the positional relation between the magnetic poles of the rotor and the coils U to W at the quiescent state is detected in advance. FIG. 6 is for describing the detection of the position of the rotor according to this embodiment for detecting the positional relation between the magnetic poles and the coils U to W at the quiescent state. In FIG. 6, (a) is for measuring the voltage value at the time of the switching operation between the three-phase coils U to W to perform the position detection in the case of the circuit arrangement shown in FIG. 2, and (b) is for measuring the switching time between the three-phase coils U to W to perform the position detection in the case of the circuit arrangement shown in FIG. 3. Here, the illustration for the FIG. 4 circuit arrangement is omitted because the switching time measurement for the position detection to be affected in the FIG. 4 circuit arrangement can easily be understood from the FIG. 6(b) illustration.

At the uppermost portion of FIG. 6, there are illustrated energization patterns for the respective coils U to W, where characters U, V and W represent the three-phase coils U to W, #1 to #6 denote the time periods of the energizations according to the respective patterns corresponding to the three-phase coils U to W switching modes. Reference #0 represents the time period for a predetermined energization pattern to accumulate an electromagnetic energy in the motor coils U to W at the initial condition before the energization operations corresponding to #1 to #6. In addition, character H represents the voltage level of the other terminal (which is not connected in common to the other coils) of the coil into which the current due to the power supply is introduced (for example, the voltage level of the terminal c of the coil W in FIG. 1C or the voltage level of the terminal b of the coil U in FIG. 1D). Character L designates the voltage level of the other terminal of the coil from which the current flows into the power supply (for example, the voltage level of the terminal b of the coil U in FIG. 1C or the terminal c of the coil W in FIG. 1D), and character Z depicts the voltage level of the other terminal of the coil which is not coupled to the power supply (for example, the voltage level of the other terminals a of the coils V in FIGS. 1C and 1D).

In (a) and (b) of FIG. 6, the portions corresponding to the U to W phases and the neutral point voltage stated at the left sides are for indicating the voltages Vcom to be developed at the connection point Pcom of the three-phase coils U to W and the voltages to be developed at the other terminals of the respective coils U to W in response to the energizations to the three-phase coils U to W. Moreover, at the lowermost portions of (a) and (b) of FIG. 6 stated as the comparator output and the measurement time, there are illustrated a signal to be outputted from the comparator (voltage-measuring circuit 47) to a line o in FIG. 3 and the times taken for the measurements at every energization pattern. In addition, arrows 1 to 6 in (a) of FIG. 6 respectively indicate the measurement points of the voltages Vcom to be developed at the connection point Pcom of the three-phase coils U to W in response to the energizations to the three-phase coils U to W performed in accordance with the six energization patterns #1 to #6 shown in the energization pattern table.

In cases where the energizations for all combinations of two of the three-phase coils U to W are performed through the power supply whose voltage is Vcc when the rotor is in the stopping state, the voltage Vcom to be developed at the connection point Pcom in the steady state becomes Vcc/2 under the conditions that the plus terminal of the power supply is coupled to the other terminal of one of the three-phase coils U to W and the minus terminal thereof is coupled to the other terminal of the other coil thereof (see Fogs. 1C and 1D).

Here, since as described above the three-phase coils U to W are respectively wound around a ferromagnetic core 43, the respective inductance values of the three-phase coils U to W vary by the permeabilities varying in accordance with the amounts of the magnetic fluxes passing though the core portions around which the respective coils U to W are wound. The amount of the magnetic flux passing through the coil-wound core portion is the vector sum of the amount of the magnetic flux generated by the coil in accordance with the magnitude of the current flowing therethrough and the direction of the current passing through the core portion and the amount of the magnetic flux passing from one magnetic pole of the rotor through the core portion to the other magnetic pole of the rotor. Therefore the inductance values of the respective coils U to W vary in accordance with the combination of the positional relation between the magnetic poles of the rotor and the three-phase coils U to W and the kind of one energization pattern selected from the six kinds of energization patterns for all combinations of two of the three-phase coils U to W. Accordingly, with the six kinds of energization patterns being successively performed with respect to the three-phase coils U to W, on the basis of the states of the six neutral point voltages to be independently measured at the transitions at the neutral point Pcom in correspondence with the six kinds of energization patterns and the discharge current of the accumulated energies of the coils which are in the non-energized states, it is possible to obtain the positional relation between the magnetic poles of the rotor, which is in the stopping state, and the three-phase coils U to W.

Secondly, a description will be made hereinbelow with reference to FIGS. 2 and 6 in terms of the measurements of the voltages at the switching times between the three-phase coils U to W for the position detection. In the sensorless type, brushless DC motors, for obtaining the positional relation between the magnetic poles of the rotor, which is in the stopping state, and the three-phase coils U to W, the control unit 1 first generates a control signal which is in turn supplied through a transmission line e to the commutation control circuit 4. The commutation control circuit 4 causes the above-described six kinds of energization patterns for all combinations of two of the three-phase coils U to W to be successively performed at a predetermined short time interval (50 μsec.). The setting of this time interval is made by a control signal to be supplied from the control unit 1 through a transmission line a to the timer 3. In addition, the control unit 1 gives a control signal to the pulse width modulation circuit 8 through a transmission line k, whereby the pulse width modulation circuit 8 supplies a signal with a duty cycle of 100% to the integrator 7 of the time for the executions of the six kinds of energization patterns so as to cause the current control circuit 6 to enter into the continuous energizing state. The above-described timer 3 gives a signal through a transmission line b to the control unit 1 at the timing of elapse of 25 μsec at every energization pattern. In response to this signal supply, the control unit 1 gives a signal to the AD converting and voltage-measuring circuit 9 through a transmission line n. The AD converting and voltage-measuring circuit 9 converts the neutral point voltage Vcom supplied from the neutral point Pcom through a transmission line i into a digital form at the timing of the elapse of 25 μsec at every energization pattern, the digital neutral point voltage Vcom being supplied through a transmission line o to the control unit 1. The neutral point voltages thus measured when the rotor is in the stopping state respectively correspond to the voltages indicated by the arrow 1 to 6 shown in (a) of FIG. 6. The control unit 1 supplies the neutral point voltage Vcom data through a transmission line c to the memory unit 2 so as to be stored therein. For example, the neutral point voltage Vcom data are as shown in the following table 1.

| Energization Pattern | Voltage data | Difference |
| --- | --- | --- |
| 1 | 166 | −23 |
| 2 | 67 | 0 |
| 3 | 205 | 16 |
| 4 | 64 | −3 |
| 5 | 189 | 0 |
| 6 | 70 | 3 |

That is, in the above table, the obtained data are divided with respect to the neutral point voltage Vcom (about ½ of the power-supply voltage) into two groups which are offset to the plus side and minus side. The item "difference" in the table represents the differences from the central value at every group. The relative position between the magnetic poles of the rotor and the coils U to W can be obtained from the energization pattern indicating the largest difference. Here, it is also appropriate that a decision is made at every energization pattern as to whether the deviation from the steady-state neutral point voltage Vcom exceeds a predetermined value so as to obtain the relative position from the energization pattern in which the deviation exceeds the predetermined value. This method can shorten the time required for the decision.

As described above, the inductance values of the three-phase coils U to W vary with specific patterns in accordance with the relative position relation between the magnetic poles of the rotor and the three-phase coils U to W and the energization patterns to the three-phase coils U to W. In the energizations for all combinations of two of the three-phase coils U to W, since the inductance variation pattern is obvious such that in the case of FIG. 1A, the inductance values of the three-phase coils U to W become great and in the case of FIG. 1B the inductance values thereof become small. Further, the energization pattern to the coils U to W is under control of the control unit 1. If the variation of the neutral point voltage Vcom on the time axis, which occurs in accordance with the ratio of the impedances of the coils U to W and the discharge current of the electromagnetic energy. $LI^2/2$ when the accumulated energy in the non-energized coil is measured at the transition time in the case that the energizations are performed with respect to the three-phase coils U to W and when the rotor is in the stopping state, it is possible to establish the positional relation between the magnetic poles of the rotor and the three-phase coils U to W. Thus, the relative position therebetween is detectable with the voltage variation state at every energization pattern being measured as the time value.

Returning again to FIG. 6, in the signal indicated as the comparator output in (b) of FIG. 6, the durations of the high level state of the output signal to be obtained by the comparison with the reference voltage are different because of the difference between the energizations performed in accordance with the six energization patterns #1 to #6 at a predetermined time interval (100 μsec). This output state variation is because of the fact that the inductance values of the three-phase coils U to W vary in accordance with the combination of the relative position relation between the magnetic poles of the rotor and the coils U to W and the kind of the energization pattern to be taken whereby the time constant based on the resistance and inductance value of each coil varies to cause the variation of the inclination of the discharge current due to the accumulated electromagnetic energy on the time axis.

In (b) of FIG. 6, in order for obtaining the relative position relation between the magnetic poles and the coils U to W at the time of start of the brushless DC motor, the control unit first generates a control signal to be supplied through the transmission line e to the commutation control circuit 4, whereby the three-phase coils U to W are successively energized with the six kinds of the energization patterns at a predetermined short time interval (100 μsec, prestored in the timer 3). In addition, the control unit 1 supplies a signal to the pulse width modulation circuit 8 through the transmission line k whereby the pulse width modulation circuit 8 supplies the integrator 7 with a signal with a duty cycle of 100% for the time periods for the six kinds of energization patterns so as to cause the current control circuit 6 to take the continuous energizing state. The voltage-measuring circuit 47 successively compares the reference voltage with the neutral point voltages Vcom developed due to the six kinds of energization patterns at the predetermined short time interval, the output thereof being led through the transmission line o to the control unit 1.

Furthermore, in FIG. 4, the voltages to be developed at the other terminals of the three-phase coils U to W are independently supplied through the transmission lines j(u) to j(w) to the voltage-measuring circuits (comparators) 47u to 47w the outputs of which are respectively supplied through the transmission lines o(u) to o(w) to the control unit 1. Here, the voltages to be supplied to the voltage-measuring circuits 47u to 47w vary such as illustrated as "neutral point voltage" in (b) of FIG. 6.

In the position detecting system of the sensorless type brushless DC motor according to this invention, the voltage obtained by dividing the power-supply voltage by the ratio of the impedances of the three-phase coils U to W appears at the neutral point Pcom of the coils U to W. Thus, even in the case that the resistance values of the coils U to W vary due to variation of the ambient temperature and the heating of the coil portions and the like, since the neutral point voltage which is not varied in accordance therewith and has a large value is arranged to be measured, it is possible to accurately and effectively detect the stopping position of the rotor of the brushless DC motor.

Figure 7:
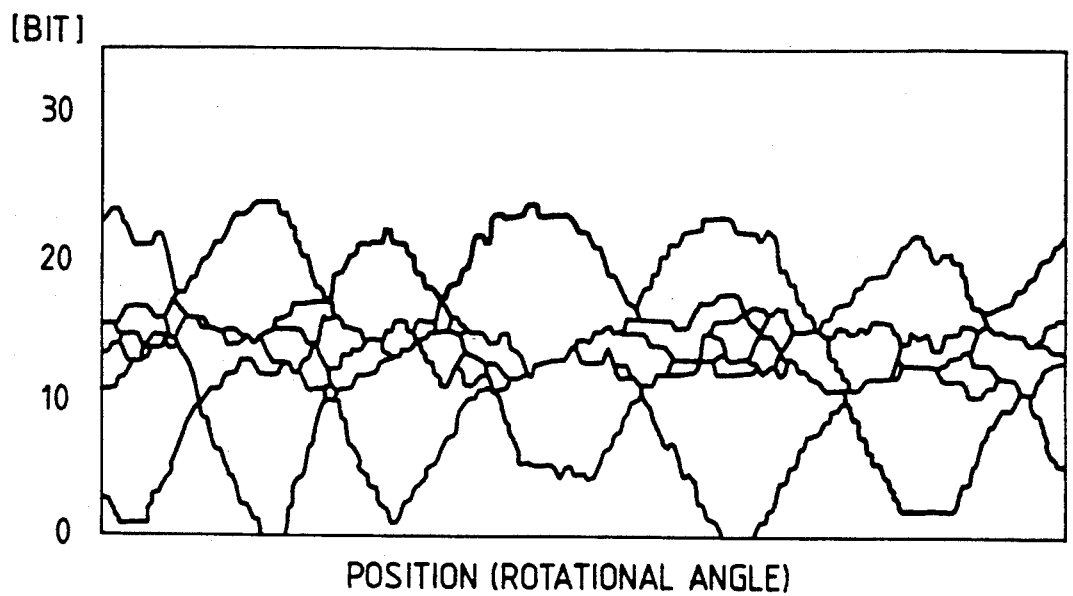
FIG. 7 shows one example of the measurement result of the neutral point voltages due to the six kinds of energization patterns over one revolution of the rotor.
Figure 8:
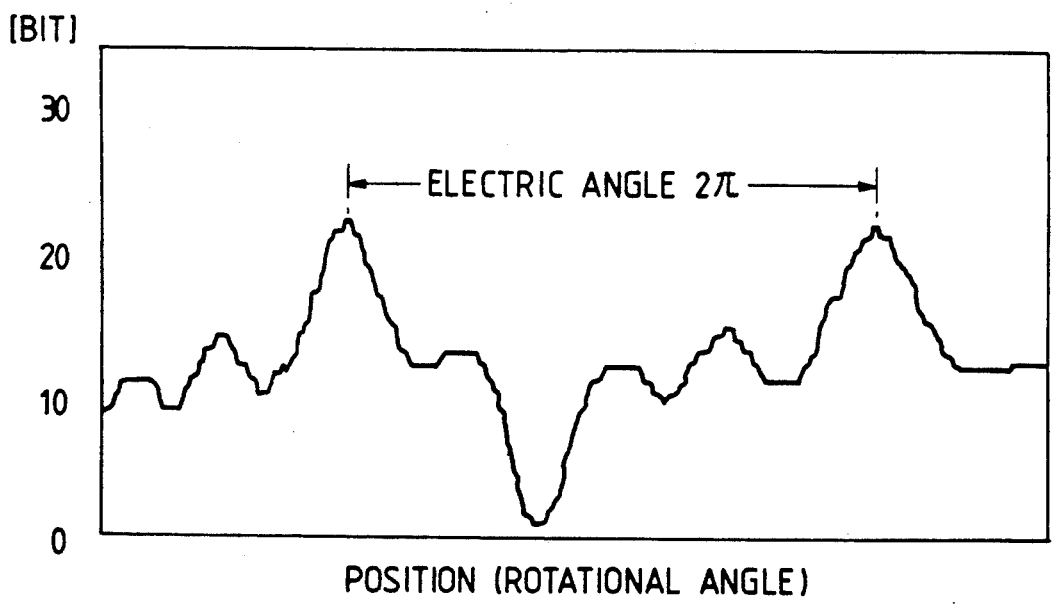
FIG. 8 illustrates one example of the measurement result of the neutral point voltage due to one energization pattern over one revolution of the rotor.

FIG. 7 shows one example of the measurement result of the neutral point voltages due to the six kinds of energization patterns over one revolution of the rotor, and FIG. 8 illustrates one example of the measurement result of the neutral point voltage due to one energization pattern over one revolution of the rotor.

It should be understood that the foregoing relates to only preferred embodiments of the present invention, and that it is intended to cover all changes and modifications of the embodiment of the invention herein used for the purposes of the disclosure, which do not constitute departures from the spirit and scope of the invention.

What is claimed is:

1. A brushless direct-current motor which is equipped with a rotor having a plurality of magnetic poles and multi-phase coils which are wound around a magnetic core to form magnetic paths and whose first terminals are connected in common to each other, said rotor being rotationally driven by selectively supplying bidirectional currents to the other terminals of said multi-phase coils, said brushless direct-current motor comprising:

energization means for successively performing energizations of said multi-phase coils with energization patterns respectively predetermined for all combinations of two of said multi-phase coils when said rotor is in a stopping state;

comparison means for comparing a reference voltage with a voltage developed at the other terminal of the coil which is in a non-energized state, in correspondence with a variation of an inductance generated in the coils due to a vector sum of a magnetic flux passing through the magnetic paths in response to the energization to the coils and a magnetic flux passing through the magnetic paths by the magnetic poles of said rotor;

time-measuring means for measuring a time taken until the output value of said comparison means varies after the energization with one of said energization patterns is performed with respect to the coil whose voltage is compared therewith by the comparison means; and position detecting means for detecting a relative position of said rotor with respect to said multi-phase coils on the basis of the time value measured by said time-measuring means.

2. A brushless direct-current motor which is equipped with a rotor having a plurality of magnetic poles and multi-phase coils which are wound around a magnetic core to form magnetic paths and whose first terminals are connected in common to each other, said rotor being rotationally driven by selectively supplying bidirectional currents to the other terminals of said multi-phase coils, said brushless direct-current motor comprising:

energization means for successively performing energizations of said multi-phase coils with energization patterns respectively predetermined for all combinations of two of said multi-phase coils when said rotor is in a stopping state;

comparison means for comparing a reference voltage with a voltage developed at the commonly connected first terminals of said multi-phase coils in correspondence with a variation of an inductance generated in the coils due to a vector sum of a magnetic flux passing through the magnetic paths in response to the energization to the coils and a magnetic flux passing through the magnetic paths by the magnetic poles of said rotor;

time-measuring means for measuring a time taken until the output value of said comparison means varies after the energization; and position detecting means for detecting a relative position of said rotor with respect to said multi-phase coils on the basis of the time value measured at every energization pattern by said time-measuring means.

3. A brushless direct-current motor which is equipped with a rotor having a plurality of magnetic poles, multi-phase coils which are wound around a magnetic core to form magnetic paths and whose first terminals are connected in common to each other and a plurality of diodes provided between the other terminals of said multi-phase coils and both terminals of a power supply in reverse polarity relation, said rotor being rotationally driven by selectively supplying bidirectional currents to the other terminals of said multi-phase coils, said brushless direct-current motor comprising:

energization means for successively performing energizations of said multi-phase coils with energization patterns respectively predetermined for all combinations of two of said multi-phase coils when said rotor is in a stopping state;

voltage-measuring means for measuring a voltage developed at the commonly connected first terminals of said multi-phase coils at every energization pattern in correspondence with a variation of an inductance generated in the coils due to a vector sum of a magnetic flux passing through the magnetic paths in response to the energization to the coils and a magnetic flux passing through the magnetic paths by the magnetic poles of said rotor; and position detecting means for detecting a relative position of said rotor with respect to said multi-phase coils on the basis of the voltage measured by said voltage-measuring means.

* * * * *